Sept. 30, 1969  D. W. JONES  3,470,431
POSITION RESPONSIVE SWITCHING APPARATUS
Filed Nov. 16, 1966
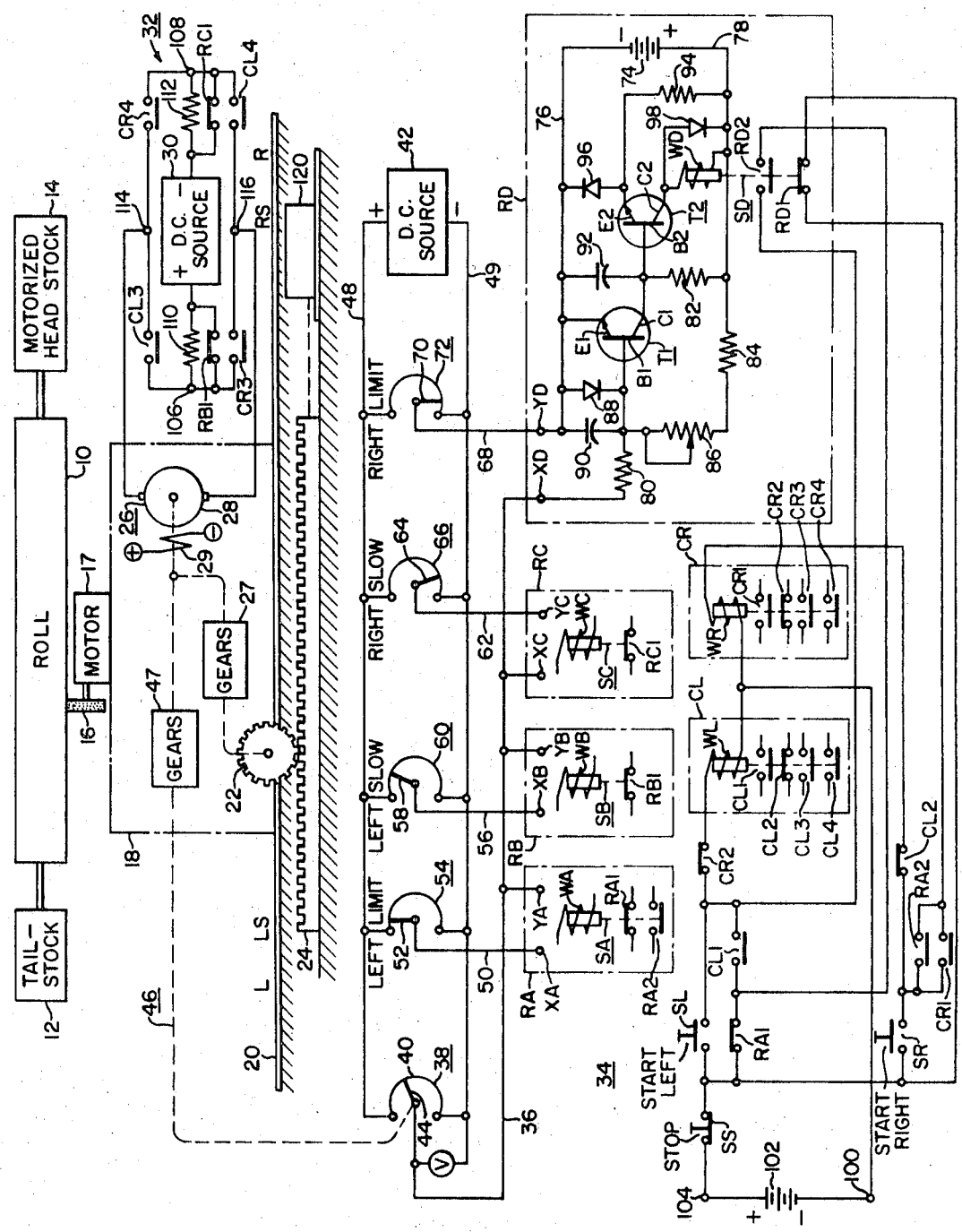
WITNESSES
Theodore T. Wrobel
James F. Young
INVENTOR
Donald W. Jones
BY
Clement J. Poznakas
ATTORNEY United States Patent Office 3,470,431
Patented Sept. 30, 1969

3,470,431
POSITION RESPONSIVE SWITCHING APPARATUS
Donald W. Jones, Cheektowaga, N.Y., assignor to Westinghouse Electric Corporation, Pittsburgh, Pa., a corporation of Pennsylvania
Filed Nov. 16, 1966, Ser. No. 594,882
Int. Cl. H02p 1/54, 5/46, 7/74
U.S. Cl. 318—18
2 Claims

ABSTRACT OF THE DISCLOSURE

A position responsive switching system is disclosed wherein the direction and extent of movement of a driven member relative to a reference, such as a workpiece, is controlled by providing reference and position responsive potentiometers in parallel across a voltage source with the wiper contact of the position responsive potentiometer being driven as a function of the direction and extent of the movement of the driven member. The switching circuit includes a switching element, which may comprise a polarized relay, connected across the wiper contacts of the position and reference potentiometer and which is designed to have a predetermined response so that this circuit will be activated depending upon the relative positions of the wiper arms of the reference and position potentiometers. The switching circuit may be utilized to detect any desired circuit change, for instance, slow-down or reversal of the drive for the driven member.

---

This invention relates to position responsive switching apparatus, and more particularly to such apparatus which effects a switching operation when a moving member reaches a predetermined position along a course of travel and relative to another member.

A highly useful aspect of the invention lies in the area of limit switches for reversing the travel of a moving member as it reaches either of opposite ends of a predetermined course of travel, whereby the moving member reciprocates along the course between opposite limits of travel. In a practical example of the latter arrangement, a carriage carrying a grinding wheel is moved back and fourth axially along a rotating processing roll with the grinding wheel in contract with the roll surface to produce a desired finish to that surface. Processing rolls are used for example in metal rolling mill stands and in paper processing machinery. In the prior art systems, the traveling carriage was reversed at opposite travel limits by mechanical engagement of limit switches. Such mechanical limit switches are often difficult and expensive to mount and adjust for different limits. They are often a source of high cost set-up time when limit adjustment is necessary to accommodate job changes.

It is therefore, an object of the present invention to provide inexpensive position responsive switching apparatus.

Another object is to provide easily adjustable position responsive switching apparatus.

A further object is to provide position responsive switching apparatus in which an electric parameter may be adjusted to change the positions to which the apparatus will respond.

The above objects may be realized in accordance with one embodiment of the invention wherein respective reference and position responsive potentiometers are paralleled across a voltage source, the wiper contract of the position responsive potentiometer being driven in direction and extent as a function of the direction and extent of movement of a driven member relative to a reference such as a workpiece, or a support frame, or the ground, or other. A polarized relay, whose operating circuit is connected across the wiper contacts of the potentiometers, has a predetermined response or operating threshold voltage. The particular position of the driven member at which the threshold voltage will occur is dependent upon the position of the wiper arm on the reference potentiometer. The relay may be used to effect any desired circuit change, such as slow-down or reversal of the drive for the driven member.

Other and further objects and advantages of the invention will become apparent from the following detailed description taken in connection with the accompanying single figure drawing wherein a preferred embodiment of the invention is diagrammatically illustrated in connection with a tool driven from side to side across the surface of a workpiece.

As seen in the drawing, a metal roll 10, for example one to be used in a paper processing mill, is rotatably mounted between a tail stock 12 and a motorized head stock 14. The peripheral surface of the roll 10 is dressed or ground by a grinding wheel 16 driven by a motor 17 mounted on a carriage 18 that is slidably mounted on a stationary way 20 for guided movement thereon parallel to the axis of the roll 10. The carriage 18 is driven along the way 20 by a pinion gear 22 engaging a fixed rack 24. Gear 22 is rotatably mounted on the carriage and is mechanically coupled to and driven by a reversible motor 26 through gearing 27. By way of example the motor is shown as a DC (direct current) motor with an armature 28 and a separately excited shunt field 29. The motor 26 is selectively connected in one or the other polarity to a DC power supply source 30 through a reversing and slow-down arrangement 32 controlled by position responsive switching apparatus 34 to switch directional modes in response to the carriage 18 reaching oppositely disposed predetermined excursion limits, and to slow the carriage before it reaches these limits.

In the position responsive switching system 34, a signal representing actual position of the carriage 18 is provided on a line 36 by an adjustable voltage divider, for example the potentiometer 38 having a resistance element 40 connected across a DC source 42, and a movable contact arm 44 connected to line 36 and responsive to the position of carriage 18. More specifically wiper arm 44 is operatively coupled to the pinion gear 22 and motor 26 by a mechanical coupling 46 including gearing 47, whereby the arm 44 rotates in unison with movement of the carriage, and the position of the arm is a function of the position of the carriage. Preferably, the movement of the arm 44 is proportional to the movement of the carriage 18. In the example shown, the output voltage of source 42 is positive on its output line 48 and negative on its output line 49.

Reference signals representing left limit, left slow-down, right slow-down, and right limit, are provided from the taps of respective voltage dividers connected across the DC source 42. More specifically, a voltage representing desired left limit is provided on a line 50 from the contact arm 52 of a potentiometer 54 connected across the lines 48 and 49. Similarly a voltage representing desired left slow-down point is provided on a line 56 from the contact arm 58 of a potentiometer 60 connected across the output of DC source 42. In like manner a voltage representing desired right slow-down point is provided on a line 62 from the wiper 64 of a potentiometer 66 connected across the output lines of source 42. In the same way, a voltage representing the desired right limit is provided on a line 68 from the movable tap 70 of a potentiometer 72 connected across the output of DC source 42.

Lines 50 and 36 are connected to input terminals XA and YA of a relay RA. Lines 56 and 36 are connected to input terminals XB and YB respectively of a relay RB. Lines 36 and 62 are connected to input terminals XC and YC respectively of a relay RC. Lines 36 and 68 are connected to input terminals XD and YD respectively of a relay RD. Relays RA, RB, RC and RD are of a type that will transfer or switch from one to another state in response to applied control voltage having reached a predetermined value while changing value in a particular direction. For example, these relays are shown as polarized relays having a predetermined response or threshold voltage. Since relays RA, RB, RC and RD have the same input or operating circuit, only relay RD is shown and described in detail.

In the disclosed example, relay RD is arranged to operate or "pickup" when the input voltage to the relay (voltage difference between terminals XD and YD) becomes negative, that is when the voltage at terminal XD becomes negative relative to terminal YD. Relay RD is powered by a suitable DC supply such as the battery 74 connected to negative and positive busses 76 and 78 respectively. Input terminal XD is connected through a current limiting resistor 80 to the base of an input transistor T1 whose collector C1 is connected to the base B2 of an output transistor T2, and through a collector resistor 82 to the positive line 78. The emitter E1 of transistor T1 is connected to the negative line 76. Transistor T1 is normally biased ON by means of the biasing network including a resistor 84, a variable resistor 86 and a diode 88. This biasing network is connected between the positive and negative busses 78 and 76, with the junction between resistor 86 and diode 88 connected to the base B1. Input terminal YD is connected to the negative line 76, and a capacitor 90 filters the input signal. The bias for transistor T1 is so arranged that a negative input signal on input terminal XD will turn transistor T1 OFF. Resistor 86 may be adjusted to set the response threshold or voltage sensitivity of relay RD as desired. When the input signal on XD swings positive, transistor T1 is turned full ON again. A filter capacitor 92 connected across the output of transistor T1 adds a time constant to the circuit to avoid response to short spurious transients.

A resistor 94 connected between the emitter E2 of transistor T2, and positive line 78, and a diode 96 connected between emitter E2 and the negative bus 76, bias transistor T2 in such a manner that when transistor T1 is ON, transistor T2 is OFF, and vice versa. The output circuit of transistor T2 includes the operating winding WD of an electromagnetic switch SD having normally closed contacts RD1 and normally open contacts RD2. The winding WD is connected between collector C2 of the transistor T2 and the positive bus 78. A diode 98 connected across winding WD provides a reactive discharge path for the winding when it is deenergized. Since the box RD is referred to as a relay, contacts RD1 and RD2 are the contacts of relay RD, and the relay RD is shown in the normal mode with switch SD dropped out, contacts RD2 normally open and contacts RD1 normally close.

By way of example the components of the circuit in RD may have the following values.

Resistors:
80 _____ ohms__ 10,000
82 _____ do____ 15,000
84 _____ do____ 100,000
86 _____ do____ 50,000
94 _____ do____ 2,700

Capacitors:
90 _____ μfd__ .22
92 _____ μfd__ 25.00

Transistors:
T1 _____ type 2N2102
T2 _____ type 2N2102

Diodes:
88 _____ type 1N458A
96 _____ type 1N458A
98 _____ type 1N458A

Battery 74 _____ volts__ 24

The operating circuits in relays RA, RB, and RC are the same as the circuit in relay RD, and corresponding parts in the relays are indicated by reference characters having the same prefix letter and a suffix letter associated with the particular relay. For example, terminals XA, XB and XC correspond to terminal XD; terminals YA, YB and YC correspond to terminal YD; switches SA, SB and SC correspond to switch SD; and windings WA, WB and WC correspond to winding WD.

Relay RA is provided with normally closed contacts RA1 and normally open contacts RA2. Relay RB is provided with normally closed contacts RB1, while relay RC has normally closed contacts RC1. Since relay RD is shown in full detail, the circuit connections to its contacts RD1 and RD2 are shown extending into the dot-dash "box" RD. While the contacts of relays RA, RB, RC and later described contactors CL and CR are shown within the respective dot-dash boxes encircling their associated relays and contactors, the circuit connections to these contacts are not shown extending into the boxes. Instead, these contacts are also shown outside their associated dot-dash boxes, but in their correct circuit context. For example, contacts RA2 are shown in the dot-dash box RA and also in the circuit below, connected between a START RIGHT switch SR and contacts RD1 of relay RD. In another example, contacts RB1 are shown in the dot-dash box RB and again in the network 32 (upper right of the drawing). The expedient of a double showing of relay contacts is employed as a matter of convenience to avoid undue complexity which would result if all relay contact connections were brought into the dot-dash relay boxes.

The position responsive switching apparatus 34 further includes electromagnetic contactors CL and CR having operating windings WL and WR, respectively. Contactor CL is provided with normally open contacts CL1, CL3, and CL4, and normally closed contacts CL2. Contactor CR is provided with normally open contacts CR1, CR3, and CR4, and normally closed contacts CR2.

The lower end of operating winding WL is connected to a terminal 100 of a power supply symbolized by a battery 102. A circuit, including in series a normally closed STOP pushbutton switch SS, a normally open START LEFT pushbutton switch and SL and normally closed contacts CR2 is connected between the upper end of winding WL and the other terminal 104 of the battery 102. Contacts RA1 and CL1 are connected in series across switch SL, and contacts RD2 are connected across contacts CL1. In similar manner the lower end of winding WR is connected to battery terminal 100, while between the upper end of winding WR and the battery terminal 104, there is a series circuit including switch SS, a normally open START RIGHT pushbutton switch SR and contacts CL2. Connected across switch SR, is a series circuit including contacts RD1 and CR1. Contacts RA2 are connected in parallel with contacts CR1.

The reversing network 32 has power input terminals 106 and 108 connected respectively through resistors 110 and 112 to opposite sides of the power source 30. Connected across resistor 110 are the contacts RD1, while contacts RC1 are connected across resistor 112. The network 32 also has a pair of output terminals 114 and 116 connected across the motor 26. Contacts CL3 are connected between terminals 106 and 114; contacts CR4 are between terminals 108 and 114; contacts CL4 are between terminals 108 and 116; and contacts CR3 are between terminals 106 and 116. It should be readily apparent that when contacts CL3 and CL4 are closed, motor 26 will rotate in one direction, for example to drive the carriage 18 to the left. On the other hand, when contacts CR4 and CR3 are closed, motor 26 will be energized to drive the carriage 18 to the right. It should also be apparent that when either of contacts RB1 or RC1 are opened, resistance will be inserted into the motor circuit thereby slowing down the motor.

Operation of the disclosed example will now be considered. Normally, all the relays and contacts are "dropped out." They are all shown in the drawing in their normally "dropped out" position. Thus all the relay and contactor contacts are shown in their respective normal positions, that is normally opened or normally closed as the case may be. From the hereinbefore description, it should be understood that each of relays RA, RB, RC and RD will pick-up when its X input terminal goes negative with respect to its Y input terminal. For convenience the input to any one of these relays shall be deemed a negative input when its X terminal goes negative relative to its Y terminal. On the other hand, when the input to any one of the relays goes positive, that is when its X input terminal goes positive relative to its Y input terminal, the so affected relay will drop out.

Although not restricted to this arrangement, potentiometers 38, 54, 60, 66 and 72 are proportioned alike, so that for any given contact arm angle or clock position each potentiometer will have at its contact arm the same potential relative to a common reference. For example, since the ends of each potentiometer winding are at about 7 o'clock and 11 o'clock, any clock arm at 6 o'clock will be at about 12.5% of the full potential across the potentiometer relative to the negative line 49 of source 42. Obviously any contact arm at 3 o'clock will be at 50% full potential, and at 11 o'clock at 100% potential, all relative to the negative line 49.

When contact arm 44 and any other contact arm for example, arm 52 are both at the same clock position, the value of the potential difference therebetween will be 0. When contact arm 44 is displaced counterclockwise of any other arm, arm 44 will be positive relative to the other arm, and the potential difference or voltage therebetween may be arbitrarily called a positive voltage. In the same manner when arm 44 is displaced clockwise of any other arm, the arm 44 is negative relative to the other arm and the potential difference therebetween may be referred to as a negative voltage.

Assume now, that for leftward travel of the carriage 18, a desired left slowdown point is indicated at LS, desired left travel limit is at L, and for travel to the right, the desired slowdown point is indicated at RS, and the right travel limit at R, these indications being referenced along the way 20. Since the grinding wheel 16 moves with the carriage 18, it will have corresponding slowdown and travel limit points along the face of the roll 10. Assume further that the mechanical coupling between the contact arm 44 and the carriage 18 is such that when the left end of carriage 18 is at LS, arm 44 will be one minute to 1 o'clock, and when the left end of carriage 18 is at L, arm 44 will be at one minute to 12 o'clock. Also assume that when the right end of carriage 18 is at RS, arm 44 will be at 1 minute past five o'clock, and when the right edge of carriage 18 is at R, arm 44 will be at 1 minute past 6 o'clock. Thus, in the example shown, arm 44 rotates counterclockwise with leftward movement of the carriage 18, and vice versa. In the particular position of the carriage 18 shown in the drawing, the distance of the left edge of the carriage from the left limit L is about ⅓ the total carriage excursion between the left and right limits L and R. Thus, the potentiometer arm 44 is approximately at 2 o'clock.

Now assume that the reference potentiometers 54, 60, 66, and 72 have been set, for example manually, to the positions shown in the drawing wherein arm 52 is at 12 o'clock, arm 58 is at 1 o'clock, arm 64 is at 5 o'clock and arm 70 is at 6 o'clock. Also assume that all the switches, relays and contactors are in their respective normal positions, as illustrated in the drawing. Under these conditions carriage 18 will be motionless. It will be noted that in the position shown in the drawing, arm 44 and line 36 are negative relative to lines 50 and 56 and positive relative to lines 62 and 68. Under these conditions the X input terminal of each of relays RA, RB, RC and RD is supplied with a positive voltage and all the relays are therefore in their respective normal or dropped out modes.

Now support it is desired to reciprocate the carriage 18 from side to side along the way 20, initially starting with a leftward movement from the position shown in the drawing. The start left switch SL is depressed, for example manually, to close the circuit between winding WL and the battery 102 thus to pick up the contactor CL thereby to effect the following circuit changes: Contacts CL1 close to latch in contactor CL; contacts CL2 open; and contacts CL3 and CL4 close to energize the motor 26 in the direction to drive carriage 18 to the left.

With leftward movement of the carriage 18, the contact arm 44 moves counterclockwise. When the contact arm 44 in its counterclockwise movement passes the 1 o'clock position, line 56 swings negative relative to line 36, thus to pick up relay RB to open contacts RB1. This introduces resistance 110 into the motor circuit thereby slowing the motor down. When, upon continued leftward movement of the carriage 18 and corresponding counterclockwise movement of the contact arm 44, the arm 44 passes the 12 o'clock position, line 50 swings negative relative to line 36 to pick up relay RA thereby opening contacts RA1 and closing contacts RA2. Opening of contacts RA1 breaks the energizing circuit to the winding WL to drop out contactor CL.

Drop out of contactor CL opens contacts CL1 and closes contacts CL2. Drop out of the contactor CL also opens contacts CL3 and CL4 to open the motor circuit thereby allowing the motor 26 to come to a stop. With contacts CL2 and RA2 closed, an energizing circuit from battery 102 to winding WR is completed through closed contacts RD1, thus to pick up contactor CR.

Pick up of contactor CR opens contacts CR2, closes contacts CR1 to latch the contactor CR, and closes contacts CR3 and CR4 to energize the motor 26 in the reverse direction to drive the carriage 18 to the right. As the carriage travels to the right, contact arm 44 is correspondingly driven clockwise. When the arm 44 in its clockwise movement passes 12 o'clock, line 50 swings positive relative to line 36 to release relay RA, thus closing contacts RA1 and opening contacts RA2. When contact arm 44 passes 1 o'clock, line 56 swings positive relative to line 36 to drop out relay RB and close contacts RB1 to shunt the resistor 110 and speed up the motor 26. Upon continued rightward movement of carriage 18, the corresponding clockwise movement of contact arm 44, the arm 44 passes 5 o'clock and 6 o'clock. When arm 44 passes 5 o'clock, line 36 swings negative relative to line 62 to pick up relay RC, thus opening contacts RC1 and inserting resistance 112 into the motor circuit to slow the motor down. When the contact arm 44 passes 6 o'clock, line 36 swings negative relative to line 68 to pick up relay RD, causing contactor CR to drop out and contactor CL to pickup and reverse the motor 26 to drive carriage 18 leftward.

The carriage 18 thus reciprocates from side to side between the limits L and R until the stop switch SS is momentarily depressed, for example manually, to open the energizing circuit to contactors CL and CR. With both of these contactors dropped out, contacts CL1 and CR1 are open and the system cannot be started again until one of the start switches SL or SR is momentarily closed by depressing it, for example, manually. If it is desired to initially start carriage 18 to the right, then the start right switch SR should be momentarily depressed, for example manually.

It should be apparent that while relays RA, RB, RC and RD effect reversal and slow-down of drives, they may also be used to energize or control other parameters or functions or apparatus such as braking, processing, etc., in response to position of the carriage 18. It should also be understood that the particular arrangements and relations shown, are by way of example, and that other arrangements adjustments and relations may be employed in practicing the invention. For example the voltage sensitive relays may be designed and adjusted to have more or less hysteresis; also to pick up and drop out at different values of the same polarity voltage along as the rest of the system is properly correlated to effect the actions and purposes of the invention. It should be further apparent from the disclosure herein that the arrangements may be reversed in that the carriage 18 may be fixed and the rack 24 movable in order to effect position limits of a tool or movable table symbolized at 120 and mechanically coupled to the rack 24.

It should be further understood that any or all of the control circuitry at 32 and 34 may be mounted on the carriage or apart from the carriage.

In order to adjust or change any of the limits L, LS, RS and R, one has only to adjust for example, manually the potentiometer associated with that limit. For example, to change the limit L, the potentiometer contact arm 52 is adjusted as desired; to change the left slow-down point LS, the contact arm 58 of the left slow-down reference potentiometer 60 is adjusted; and in the same manner the right slow-down potentiometer 66 and the right limit potentiometer 72, are adjusted to change as desired the slow-down point RS and the right limit point R.

The reading on a voltmeter V indicates the position of the carriage 18.

From the description herein, it is seen that the disclosed apparatus provides a novel limit switch concept which is simple, economical and easy to adjust.

It is to be understood that the herein described arrangements are simply illustrative of the principles of the invention, and that other embodiments and applications are within the spirit and scope of the invention.

I claim as my invention:

1. Apparatus comprising: a movable member; a reversible drive means for moving said member; a potential source; first, second and third voltage dividers connected across said potential source, said first divider having a movable intermediate first tap, said second and third dividers having adjustable intermediate second and third taps, respectively; first switching apparatus which changes from one to another state in response to the voltage between said first and second taps reaching a pre-determined value while changing in value in a pre-determined direction; means for mechanically coupling said first tap to said member for movement along the first voltage divider in direction and extent dependent on direction and extent of travel of said member relative to a reference, whereby the voltage across said first and second taps is a function of the relative positions of said first and second taps and said predetermined voltage value occurs at a predetermined position of said member relative to said reference depending on the setting of said second tap along said second voltage divider; second switching apparatus which changes from one to another state in response to the voltage between said first and third taps reaching a given value while changing in value in a given direction, said given and predetermined directions being opposite to each other, said given value occurring at a given position of said member relative to said reference depending on the position of said third tap along the third voltage divider; and a control circuit including said first and second switching apparatus to control said drive means to effect reversal of said drive means from a first to a second direction in response to said first switching apparatus changing from said one to said another of its states, and to effect reversal of said drive means from said second direction to said first direction in response to said second switching apparatus changing from said one to said another of its states.

2. Apparatus comprising: a movable member; a reversible drive means for moving said member; a potential source; first, second and third voltage dividers connected across said potential source, said first divider having a movable intermediate first tap, said second and third dividers having adjustable intermediate second and third taps, respectively; first switching apparatus which changes from one to another state in response to the voltage between said first and second taps reaching a predetermined value while changing in value in a predetermined direction; means for mechanically coupling said first tap to said member for movement along the first voltage divider in direction and extent dependent on direction and extent of travel of said member relative to a reference, whereby the voltage across said first and second taps is a function of the relative positions of said first and second taps and said predetermined voltage value occurs at a predetermined position of said member relative to said reference depending on the setting of said second tap along said second voltage divider; second switching apparatus which changes from one to another state in response to the voltage between said first and third taps reaching a given value while changing in value and in said predetermined direction, said given value occurring before said predetermined value along the scale of said predetermined direction, said given value occurring at a given position of said member relative to said reference depending upon the position of said third tap along said third voltage divider; means for slowing down the movement of said member in response to said second switching apparatus changing from said one to said another of its positions; and control means including said first switching apparatus to control said drive means to effect reversal of said drive means from a first to a second direction in response to said first switching apparatus changing from said one to another of its states.

References Cited

UNITED STATES PATENTS

| | | | |
|---|---|---|---|
| 2,307,077 | 1/1943 | Reagan | 318—265 XR |
| 2,704,819 | 3/1955 | Bishofberger | 318—29 |
| 3,297,925 | 1/1967 | Masel | 318—28 |
| 3,383,572 | 5/1968 | Monin | 318—162 XR |

B. DOBECK, Primary Examiner

U.S. Cl. X.R.

318—28, 282